United States Patent
Miyazaki

(10) Patent No.: US 8,681,157 B2
(45) Date of Patent: Mar. 25, 2014

(54) INFORMATION PROCESSING APPARATUS, PROGRAM, AND INFORMATION PROCESSING METHOD

(75) Inventor: Reiko Miyazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 900 days.

(21) Appl. No.: 12/546,238

(22) Filed: Aug. 24, 2009

(65) Prior Publication Data

US 2010/0053192 A1 Mar. 4, 2010

(51) Int. Cl.
*G06F 17/00* (2006.01)
*G06T 1/00* (2006.01)
*G06T 13/00* (2011.01)
*G06T 15/70* (2006.01)

(52) U.S. Cl.
USPC ............................. 345/473; 345/418; 345/474

(58) Field of Classification Search
USPC .......................................... 345/418, 473, 474
See application file for complete search history.

(56) References Cited

U.S. PATENT DOCUMENTS

| | | | |
|---|---|---|---|
| 5,931,680 A * | 8/1999 | Semba | 434/307 A |
| 2006/0156906 A1* | 7/2006 | Haeker | 84/609 |
| 2007/0233726 A1* | 10/2007 | Torrens et al. | 707/102 |

FOREIGN PATENT DOCUMENTS

| | | |
|---|---|---|
| JP | 05-094884 | 4/1993 |
| JP | 10-124288 | 5/1998 |
| JP | 10-161838 | 6/1998 |
| JP | 2000-207417 | 7/2000 |
| JP | 2001-118084 | 4/2001 |
| JP | 2003-242164 | 8/2003 |
| JP | 2006-331155 | 12/2006 |
| JP | 2007-272880 | 10/2007 |
| JP | 2008-158734 | 7/2008 |
| WO | WO 2008/099251 A1 | 8/2008 |

OTHER PUBLICATIONS

Masataka Goto, A Chorus Section Detection Method for Music Audio Signals and Its Application to a Music Listening Station, IEEE Transactions on Audio, Speech and Language Processing, vol. 14, No. 5, Sep. 2006.*

* cited by examiner

*Primary Examiner* — Aaron M Richer
*Assistant Examiner* — Robert Craddock
(74) *Attorney, Agent, or Firm* — Finnegan, Henderson, Farabow, Garrett & Dunner, L.L.P.

(57) ABSTRACT

An information processing apparatus including a storage section storing a plurality of content data and characteristics data of the plurality of content data, and a creation section for creating a moving image having movement according to the characteristics data of each of the plurality of content data and for creating a list screen of the plurality of content data including the moving image for each of the plurality of content data.

6 Claims, 15 Drawing Sheets

FIG.5

Data¥segment2¥_TrackA.csv

| Segment ID | Time _begin | Time _end | Length | Refrain | Key | Mode | Tempo | Onsets | Bank | Env | Max Level |
|---|---|---|---|---|---|---|---|---|---|---|---|
| 1 | 0 | 3.8432 | 3.8432 | 0.99221 | 11 | 1 | 133.15 | 22 | 10 | 10612 | 0.19849 |
| 2 | 3.8432 | 10.93 | 7.0871 | 0.99946 | 6 | 1 | 129 | 57 | 10 | 19570 | 0.24554 |
| 3 | 10.93 | 14.885 | 3.9546 | 0.99757 | 6 | 1 | 132.51 | 25 | 10 | 10888 | 0.14407 |

Data¥envelope2¥_TrackA_1.csv

| Bank_1 | Bank_2 | Bank_3 | Bank_4 | Bank_5 | Bank_6 | Bank_7 | Bank_8 | Bank_9 | Bank_10 |
|---|---|---|---|---|---|---|---|---|---|
| 0.005339 | 0.039645 | 0.003405 | 0.009864 | 0.041355 | 0.01241 | 0.021952 | 0.006315 | 0.001106 | 0.000122 |
| 0.005249 | 0.03894 | 0.003347 | 0.009692 | 0.040617 | 0.012188 | 0.021558 | 0.006201 | 0.001086 | 0.00012 |
| 0.005161 | 0.038244 | 0.00329 | 0.009523 | 0.03989 | 0.011969 | 0.021171 | 0.00609 | 0.001067 | 0.000118 |

FIG.12

|   | a | b | c | d | e | f | g | h | i | j |
|---|---|---|---|---|---|---|---|---|---|---|
| 0 | R220 G0 B0 | R0 G0 B0 | R240 G200 B50 | R10 G0 B235 | R55 G55 B55 | R140 G90 B100 | R20 G120 B20 | R230 G150 B35 | R255 G255 B255 | R200 G0 B250 |
| 1 | R0 G0 B145 | R245 G70 B160 | R190 G170 B150 | R255 G255 B255 | R0 G225 B195 | R255 G95 B235 | R85 G150 B255 | R255 G255 B75 | R85 G150 B60 | R115 G205 B50 |
| 2 | R0 G225 B195 | R50 G90 B215 | R250 G55 B75 | R250 G125 B35 | R190 G250 B25 | R80 G160 B140 | R100 G30 B230 | R230 G40 B110 | R230 G180 B25 | R150 G220 B60 |
| 3 | R0 G0 B0 | R30 G30 B150 | R50 G110 B0 | R70 G110 B95 | R120 G145 B135 | R140 G140 B120 | R115 G110 B95 | R110 G100 B90 | R200 G200 B200 | R205 G185 B135 |
| 4 | R190 G150 B60 | R255 G230 B0 | R240 G50 B150 | R140 G170 B200 | R70 G75 B105 | R205 G185 B135 | R255 G255 B255 | R145 G255 B80 | R160 G0 B250 | R150 G210 B250 |
| 5 | R90 G0 B250 | R255 G255 B60 | R25 G230 B120 | R120 G255 B255 | R255 G100 B150 | R200 G200 B200 | R255 G225 B110 | R255 G255 B255 | R130 G0 B200 | R255 G150 B0 |
| 6 | R50 G50 B50 | R130 G40 B40 | R165 G100 B100 | R210 G200 B185 | R160 G150 B140 | R80 G55 B45 | R0 G0 B0 | R60 G70 B50 | R95 G85 B20 | R165 G145 B35 |
| 7 | R100 G100 B100 | R255 G255 B0 | R125 G125 B125 | R155 G155 B155 | R230 G230 B230 | R255 G255 B255 | R155 G205 B130 | R85 G150 B35 | R230 G150 B150 | R200 G200 B200 |
| 8 | R170 G205 B155 | R120 G205 B255 | R255 G170 B195 | R255 G125 B160 | R155 G225 B200 | R255 G255 B255 | R200 G150 B210 | R255 G200 B215 | R220 G220 B220 | R240 G200 B255 |

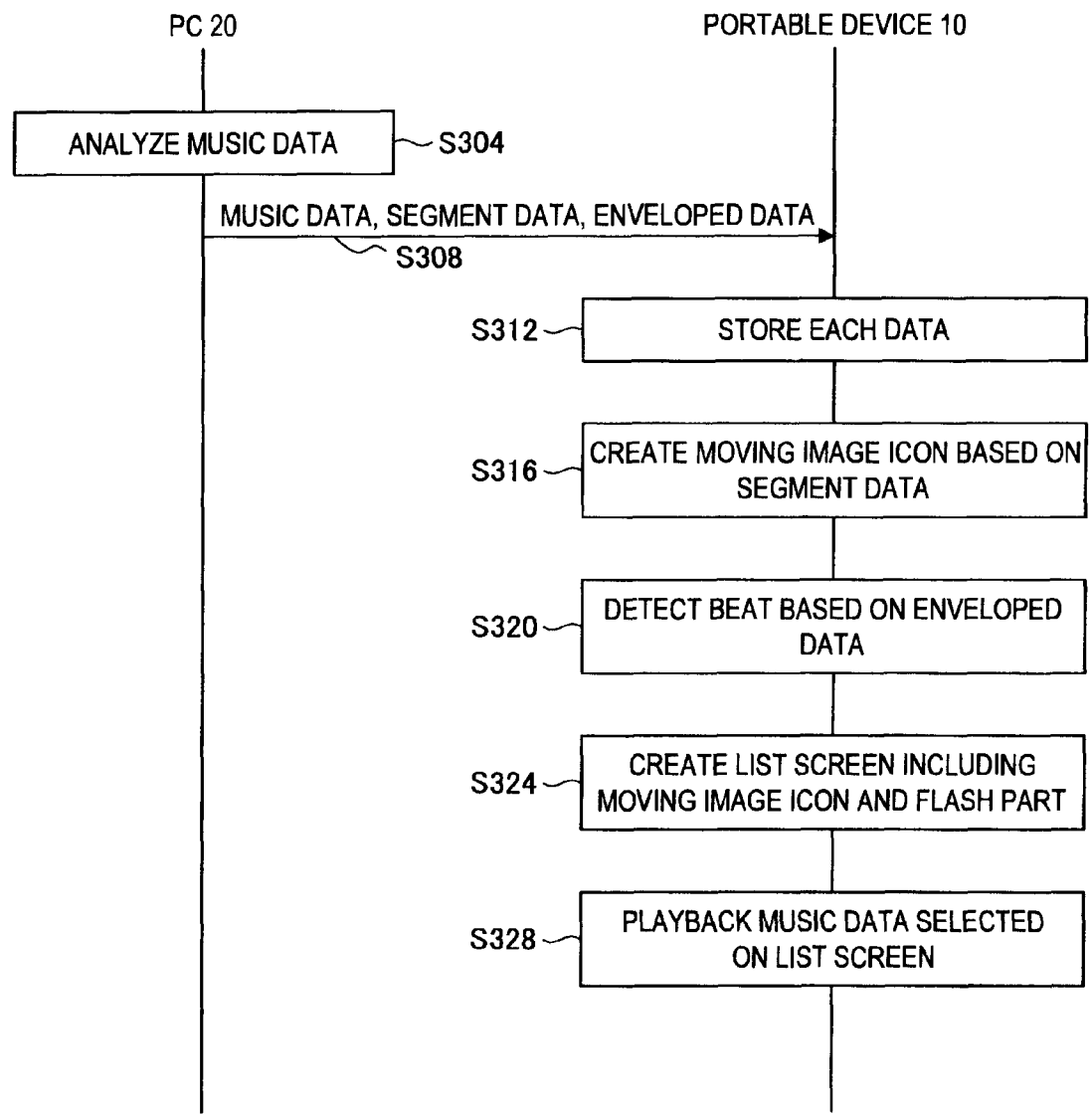

INFORMATION PROCESSING APPARATUS, PROGRAM, AND INFORMATION PROCESSING METHOD

BACKGROUND OF THE INVENTION

1. Field of the Invention

The present invention relates to an information processing apparatus, a program, and an information processing method.

2. Description of the Related Art

In recent years, information processing apparatuses having a music playback function, such as a personal computer (PC) and a portable music playback device, have become widespread. Such an information processing apparatus displays a list screen of a plurality of music data stored therein, and plays back music data selected by a user on the list screen.

Furthermore, information, such as a title and an artist name, is generally displayed on the list screen for each music data. Moreover, by displaying the details of the music data on the list screen by visualization, enhancement of convenience regarding music data selection can be expected. With this in mind, researches have been conducted on the visualization of music data.

For example, JP-A-2000-207417 discloses an information processing apparatus for displaying distribution of frequency components of music data on a list screen. Furthermore, JP-A-2006-331155 discloses a display device for selectively displaying a still image representing content. Similarly, JP-A-2003-242164 discloses a device for creating a still image for a thumbnail in accordance with a feature quantity of a music piece.

SUMMARY OF THE INVENTION

However, a traditional visualization only expresses the music data on the list screen as a still image. Thus, the amount of information which can be provided to a user by the visualized still image is limited.

Accordingly, the present invention has been achieved in view of the above, and it is desirable to provide a new and improved information processing apparatus, program, and information processing method that are capable of expressing the characteristics of content data with a moving image.

According to an embodiment of the present invention, there is provided an information processing apparatus including a storage section storing a plurality of content data and characteristics data of the plurality of content data, and a creation section for creating a moving image having movement according to the characteristics data of each of the plurality of content data, and for creating a list screen of the plurality of content data including the moving image for each of the plurality of content data.

The characteristics data may include tempo information of each of the plurality of content data, and the creation section may create the moving image of which movement is more dynamic as tempo of each of the plurality of content data is faster.

The list screen further may include a flash part corresponding to each of the plurality of content data, the characteristics data may include intensity information of each frequency range of each of the plurality of content data, the information processing apparatus may further include a detection section for detecting a beat of each of the plurality of content data based on the intensity information of each frequency range, and the creation section may flash an image in the flash part according to the beat of the each of the plurality of content data detected by the detection section.

Each of the plurality of content data may be music data, and the intensity information of each frequency range may indicate intensity of each frequency range of a refrain portion among the music data.

One or more colors may be assigned to respective genres of the plurality of content data, and the moving image may be formed from at least one color among the one or more colors assigned to a genre of content data to which the moving image corresponds.

The larger the number of signal peaks included in the content data to which the moving image corresponds, the larger the number of colors, among the one or more colors, the moving image may be formed from.

The information processing apparatus may further include an analysis section for analyzing each of the plurality of content data and for acquiring the characteristics data of each of the plurality of content data.

According to another embodiment of the present invention, there is provided a program for causing a computer to function as a storage section storing a plurality of content data and characteristics data of the plurality of content data, and a creation section for creating a moving image having movement according to the characteristics data of each of the plurality of content data and for creating a list screen of the plurality of content data including the moving image for each of the plurality of content data.

According to another embodiment of the present invention, there is provided an information processing method including the steps of storing in a storage medium a plurality of content data and characteristics data of the plurality of content data, creating a moving image which corresponds to each of the plurality of content data and which has movement according to the characteristics data of each of the plurality of content data, and creating a list screen of the plurality of content data including the moving image corresponding to each of the plurality of content data.

According to the embodiments of the present invention described above, the characteristics of content data can be expressed with a moving image.

BRIEF DESCRIPTION OF THE DRAWINGS

FIG. 5 is an explanatory diagram showing concrete examples of segment data and enveloped data.

FIG. 12 is an explanatory diagram showing color arrangements of squares in each cluster.

FIG. 15 is a sequence diagram showing a flow of an operation of the information processing system according to the present embodiment.

DETAILED DESCRIPTION OF THE PREFERRED EMBODIMENTS

Figure 1:
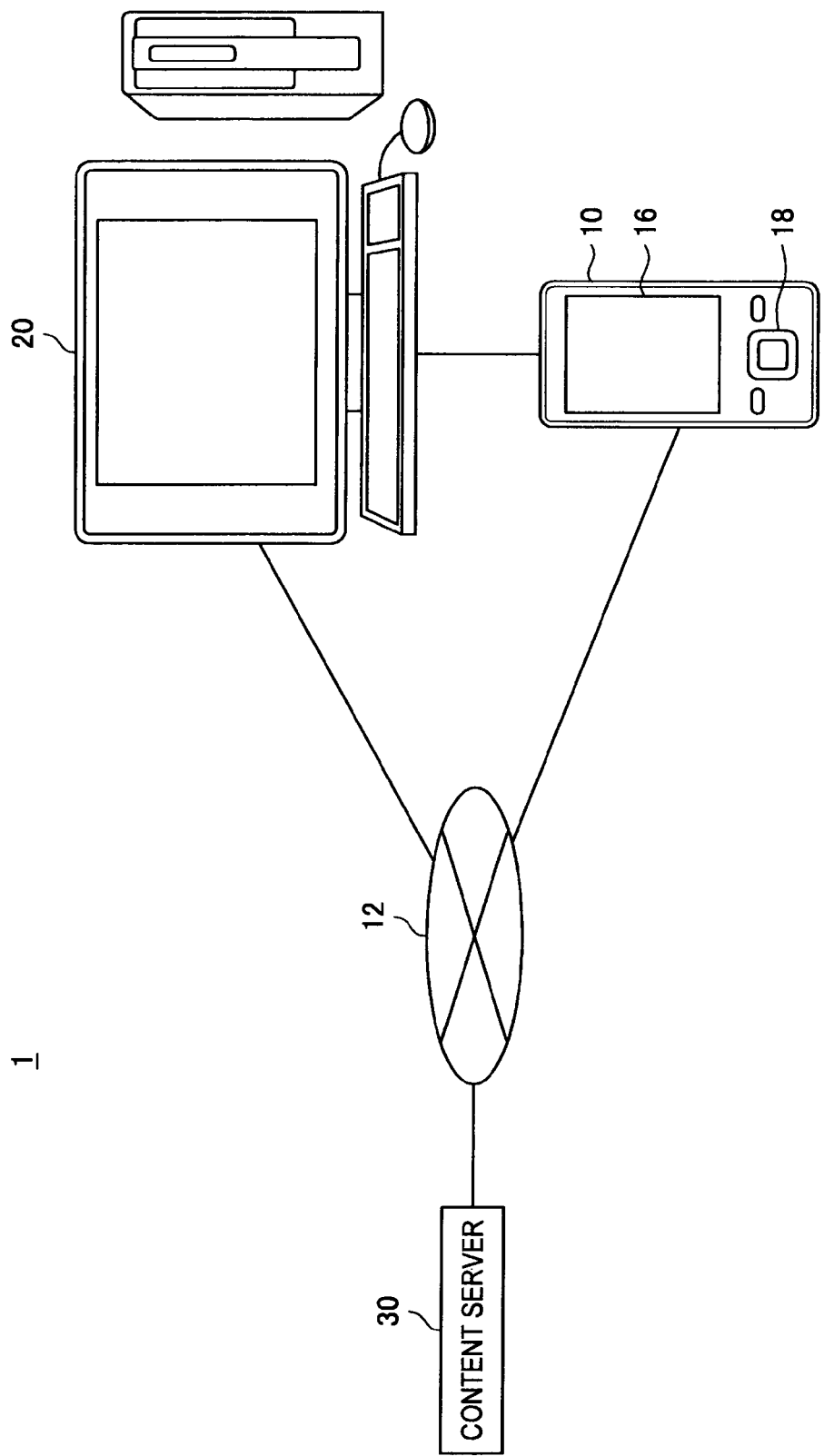
FIG. 1 is an explanatory diagram showing an overall configuration of an information processing system according to the present embodiment.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

The "preferred embodiments of the present invention" will be described in the order shown below.

(1) Overall configuration of information processing system according to present embodiment
(2) Circumstances leading to present embodiment
(3) Configuration of PC
(4) Configuration of portable device
(5) Operation of information processing system according to present embodiment
(6) Conclusion and supplement

(1) Overall Configuration of Information Processing System According to Present Embodiment Explanation of Terms First, before describing the overall configuration of an information processing system 1 according to the present embodiment, terms used in this specification will be explained below. The explanations below are only examples of meanings of respective terms, and each of the terms may include other meanings as well.

Content Data

Concept including audio data such as music, a lecture and a radio program, a video data such as a motion picture, a television program, a video program, a photograph, a document, a painting and a chart, and miscellaneous data such as a game and software.

Tempo

Speed of beat in music, beat interval. Tempo information is information indicating specific tempo such as crotchet=60.

Beat

Rhythm of music, or time points in music.

Refrain

Music is composed of an A melody, a B melody, a refrain, an ending, and the like, for example, and the refrain corresponds to the catchy part of the music among these elements.

Genre

Style or type of music. Genre may be house music, ambient music, techno music, jazz music, mesomusic, pops, mellow music/Japanese traditional ballad, café music, bossa nova music, and the like, for example.

<Overall Configuration of Information Processing System>

FIG. 1 is an explanatory diagram showing an overall configuration of the information processing system according to the present embodiment. As shown in FIG. 1, the information processing system 1 includes a portable device 10, a communication network 12, a PC 20, and a content server 30.

The communication network 12 is a wired or wireless transmission line for information to be transmitted from a device connected to the communication network 12. For example, the communication network 12 may be constituted of a public network such as the Internet, a telephone network and a satellite network, various local area networks (LAN) including Ethernet (registered trademark), or a wide area network (WAN). Furthermore, the communication network 12 may also be constituted of a leased-line network such as an Internet protocol-virtual private network (IP-VPN).

The content server 30 stores various content data. Furthermore, the content server 30 is connected with the portable device 10 and the PC 20 via the communication network 12, and transmits the content data in response to requests from the portable device 10 and the PC 20, for example. Moreover, in the present embodiment, an explanation will be made focusing on an example where the content data is music data.

The PC 20 transmits music data acquired by an arbitrary method to the portable device 10. The PC 20 can acquire the music data from the content server 30 connected via the communication network 12 or a storage medium such as a compact disc (CD), for example. Furthermore, the PC 20 can also create a list screen of the acquired music data, and playback the music data selected by a user on the list screen.

The portable device 10 acquires the music data from the content server 30 connected via the communication network 12 or from the PC 20, creates a list screen of the acquired music data, and displays the list screen on a display section 16. Furthermore, the portable device 10 plays back the music data selected by a user on the list screen via an operation section 18.

Moreover, in FIG. 1, the portable device 10 and the PC 20 are shown only as examples of an information processing apparatus, and the information processing apparatus is not limited to such examples. For example, the information processing apparatus may be a home video processing apparatus (a DVD recorder, a video recorder or the like), a personal digital assistant (PDA), a home game machine, or a home electronics appliance. Furthermore, the information processing apparatus may also be a mobile phone, a Personal Handyphone System (PHS), a portable music playback device, a portable video processing device, or a portable game machine.

(2) Circumstances Leading to Present Embodiment

As described above, the portable device 10 according to the present embodiment creates a list screen of music data. Information such as a title and an artist name of each music data is generally included in the list screen. Moreover, by displaying the details of the music data on the list screen by visualization, enhancement of convenience regarding music data selection can be expected. With this in mind, researches described below are conducted with respect to the visualization of music data.

(1) Map the result of classification of a plurality of music pieces on a graph.
(2) Identify the sound source when the sound source of a music piece is unknown, and express the instrument or voice with an image.
(3) Analyze the rhythm or chord progression pattern of a music piece, and express a corresponding genre with an image.
(4) Calculate signal feature quantity of a music piece, and make a correlation between the music piece and an existing photograph or image matching the feature quantity.

(5) Calculate signal feature quantity of a music piece, and create an image matching the feature quantity.
(6) Visualize based on signal information of a music piece being played back (general visualization).

However, in the above-described (1), since a plurality of music pieces are mapped on a two-dimensional plane, a feature quantity that can be expressed is limited to two dimensions. Furthermore, even if colors and shapes are used, the feature quantity can be expressed in only up to approximately four dimensions. Thus, with the above-described (1), it is difficult to express that some feature quantities are similar to each other, whereas other feature quantities are completely different from each other, or where the feature quantities are close to each other, it is difficult to express "how much difference there is between the feature quantities."

Furthermore, with the above-described (2) and (3), since it is difficult for a user to imagine the mood of music from an image, and thus there are cases where it is hard to convey the difference between a plurality of music pieces.

Furthermore, with the above-described (4), there is a problem in that there may not be an "existing photograph or image" that fits the impression of a selected music piece. Furthermore, since which of the images fits the impression of a music piece depends on each user's viewpoint, the similarity between the feature amount of a music piece and the feature amount of an image needed to be correlated with each user.

Furthermore, with the above-described (5), since an image matching a music piece is created, a "closer correlation between a song and an image" can be expected compared to the above-described (4). However, the playing time of a music piece is variable time-series information ranging from 3 minutes or less (a pop song, for example) to 1 hour or more (classical music, for example), and thus the expression thereof with a still image of a limited size is difficult. Furthermore, with the above-described (6), since "portion currently being played back in a music piece is visualized," the above-described (6) cannot be applied to a "selection process" before the playback of music.

Thus, in view of the foregoing, the PC 20 and the portable device 10 according to the present embodiment have been achieved. According to the PC 20 and the portable device 10 according to the present embodiment, the characteristics of music data can be expressed on a list screen with a moving image. In the following, explanation will be made in detail for the PC 20 and the portable device 10.

(3) Configuration of PC

Figure 2:
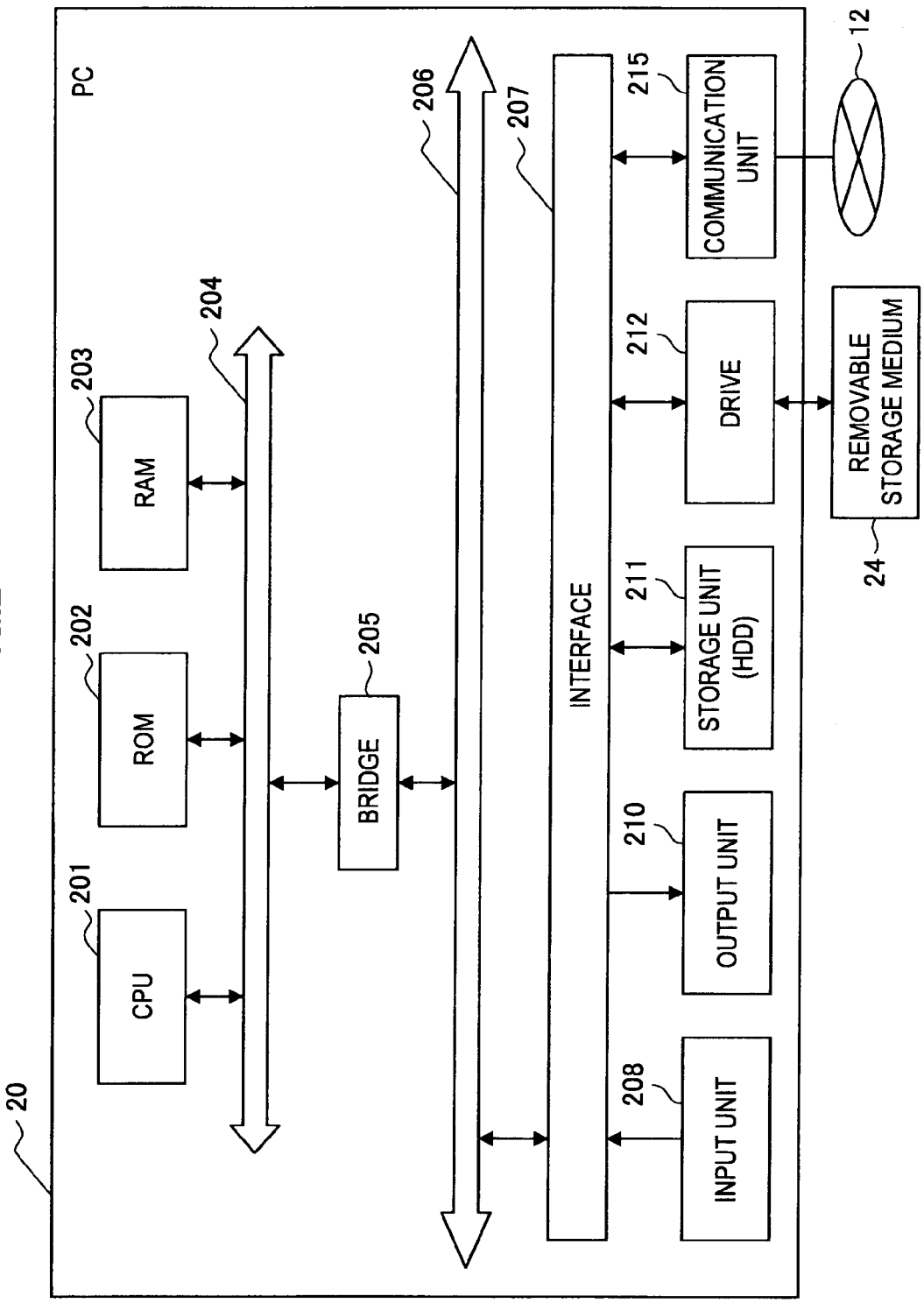
FIG. 2 is a block diagram showing a hardware configuration of a PC.

First, referring to FIG. 2, a hardware configuration of the PC 20 according to the present embodiment will be described. FIG. 2 is a block diagram showing the hardware configuration of the PC 20. The PC 20 includes a central processing unit (CPU) 201, a read only memory (ROM) 202, a random access memory (RAM) 203, and a host bus 204. Furthermore, the PC 20 includes a bridge 205, an external bus 206, an interface 207, an input unit 208, an output unit 210, a storage unit (HDD) 211, a drive 212, and a communication unit 215.

The CPU 201 functions as an arithmetic operation processing unit and a control unit, and controls the overall operation of the PC 20 according to various programs. Furthermore, the CPU 201 may also be a microprocessor. The ROM 202 stores a program, arithmetic parameters and the like to be used by the CPU 201. The RAM 203 temporarily stores a program to be used by the CPU 201 in its execution, parameters that change appropriately in the execution of the program, or the like. The CPU 201, the ROM 202 and the RAM 203 are interconnected through the host bus 204 configured from a CPU bus or the like.

The host bus 204 is connected to the external bus 206 such as a peripheral component interconnect/interface (PCI) bus through the bridge 205. Moreover, the host bus 204, the bridge 205 and the external bus 206 need not necessarily be configured separately, and the functions thereof may be implemented in a single bus.

The input unit 208 is configured from input means for a user to input information, such as a mouse, a keyboard, a touch panel, a button, a microphone, a switch or a lever, an input control circuit for generating an input signal based on an input by the user and outputting the input signal to the CPU 201, and the like. The user of the PC 20 can input various data to the PC 20 or issue an instruction for a processing operation by operating the input unit 208.

The output unit 210 includes a display unit, such as a cathode ray tube (CRT) display device, a liquid crystal display (LCD) device, an organic light emitting diode (OLED) device or a lamp, for example. Furthermore, the output unit 210 includes an audio output device such as a speaker or a head phone. The output unit 210 outputs played back content, for example. Specifically, the display unit displays various information such as played back video data in the form of text or image. On the other hand, the audio output unit converts the played back audio data or the like to sound and outputs the same.

The storage unit 211 is a device for storing data configured as an example of a storage section of the PC 20 according to the present embodiment. The storage unit 211 may include a storage medium, a recording unit for recording data in the storage medium, a readout unit for reading out data from the storage medium, a delete unit for deleting data stored in the storage medium, or the like. The storage unit 211 is configured from a hard disk drive (HDD), for example. The storage unit 211 drives the hard disk, and stores a program to be executed by the CPU 201 and various data. Furthermore, the storage unit 211 is stored music data, segment data and enveloped data described later.

The drive 212 is a reader/writer for a storage medium, and is built in or externally attached to the PC 20. The drive 212 reads out information stored in an attached removable storage medium 24, such as a magnetic disk, an optical disk, a magneto-optical disk or a semiconductor memory, and outputs the information to the RAM 203.

The communication unit 215 is a communication interface configured from a communication device or the like for connecting to the communication network 12 and the portable device 10, for example. Furthermore, the communication unit 215 may be a wireless local area network (LAN) compatible communication device, a wireless USB compatible communication device, or a wired communication device performing a communication by wire. The communication unit 215 receives/transmits various data, such as music data, to/from the content server 30 via the communication network 12.

Moreover, the hardware configuration of the PC 20 has been described in the above with reference to FIG. 2. Since the hardware of the portable device 10 can be configured to be substantially the same as that of the PC 20, the explanation thereof will be omitted.

Figure 3:
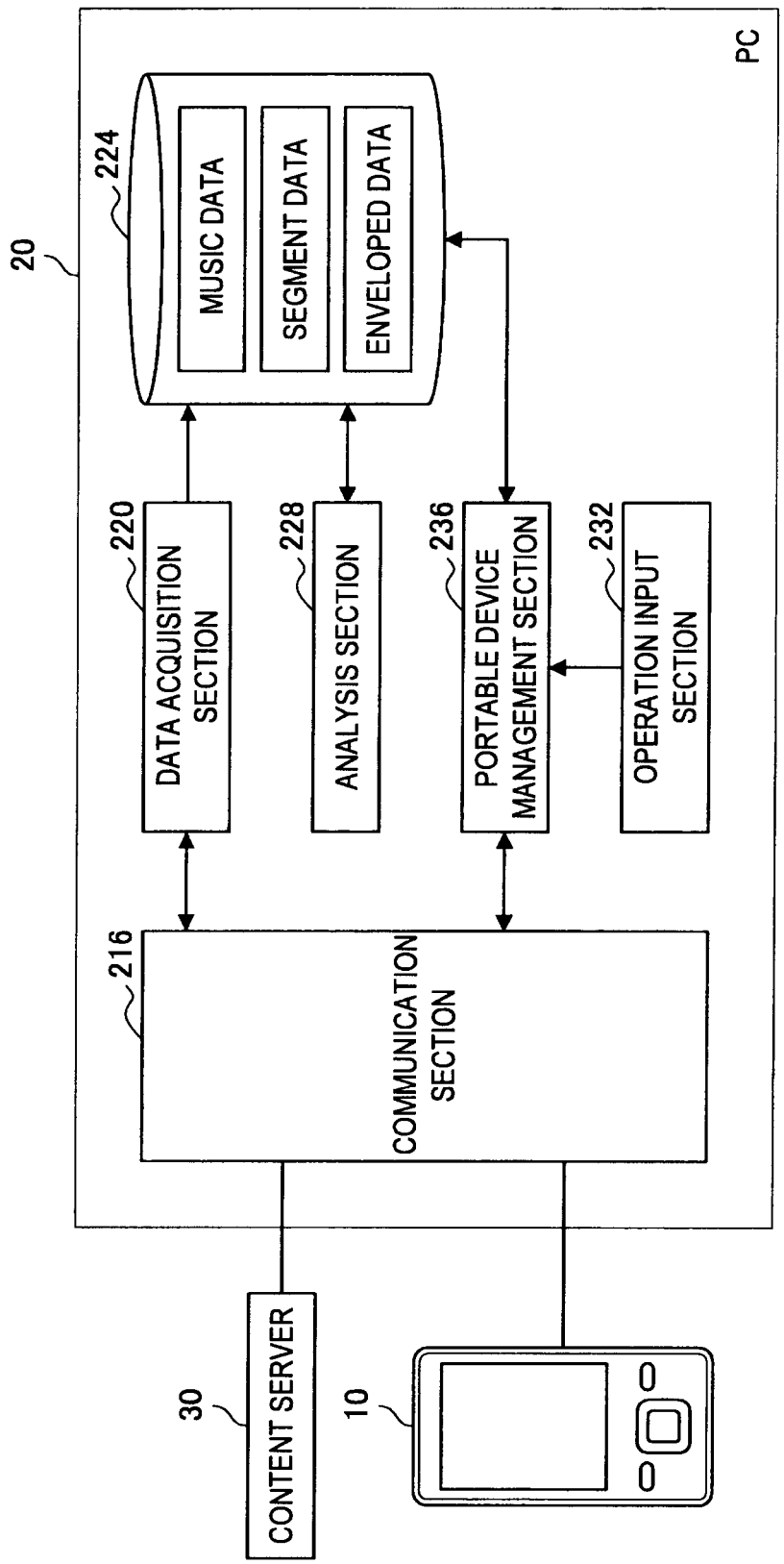
FIG. 3 is a function block diagram showing a configuration of a PC according to the present embodiment.

FIG. 3 is a function block diagram showing a configuration of the PC 20 according to the present embodiment. As shown in FIG. 3, the PC 20 includes a communication section 216, a data acquisition section 220, a storage section 224, an analysis section 228, an operation input section 232, and a portable device management section 236.

The communication section 216 corresponds to the communication unit 215 shown in FIG. 2, and has a function of a transmitting section and a receiving section for transmitting/receiving various data to/from the content server 30 and the portable device 10.

The data acquisition section 220 acquires music data by an arbitrary method. For example, the data acquisition section 220 may request the content server 30 for music data, and may acquire the music data transmitted from the content server 30 in response to the request. Or, the data acquisition section 220 may also read out the music data from the storage medium in which the music data is stored.

The storage section 224 is a storage medium for storing various data. For example, the storage section 224 stores the music data acquired by the data acquisition section 220. Furthermore, the storage section 224 stores an analysis result (segment data, enveloped data) of the music data by the analysis section 228.

Moreover, such a storage section 224 corresponds to the storage unit 211 shown in FIG. 2, and may be a storage medium such as a non-volatile memory, a magnetic disk, an optical disk or a magneto optical (MO) disk. The non-volatile memory may be an electrically erasable programmable read-only memory (EEPROM), or an erasable programmable ROM (EPROM), for example. Furthermore, the magnetic disk may be a hard disk, a discoid magnetic disk, or the like. Furthermore, the optical disk may be a compact disc (CD), a digital versatile disc recordable (DVD-R), a Blu-ray disc (BD: registered trademark), or the like.

The analysis section 228 analyzes the music data acquired by the data acquisition section 220, and acquires the characteristics data, such as the segment data or the enveloped data, of the music data. For example, the analysis section 228 divides certain music data into multiple segments, and acquires the characteristics data (music feature quantity) of each segment. In the following, segmentation of music data, and the segment data and the enveloped data will be described.

Figure 4:
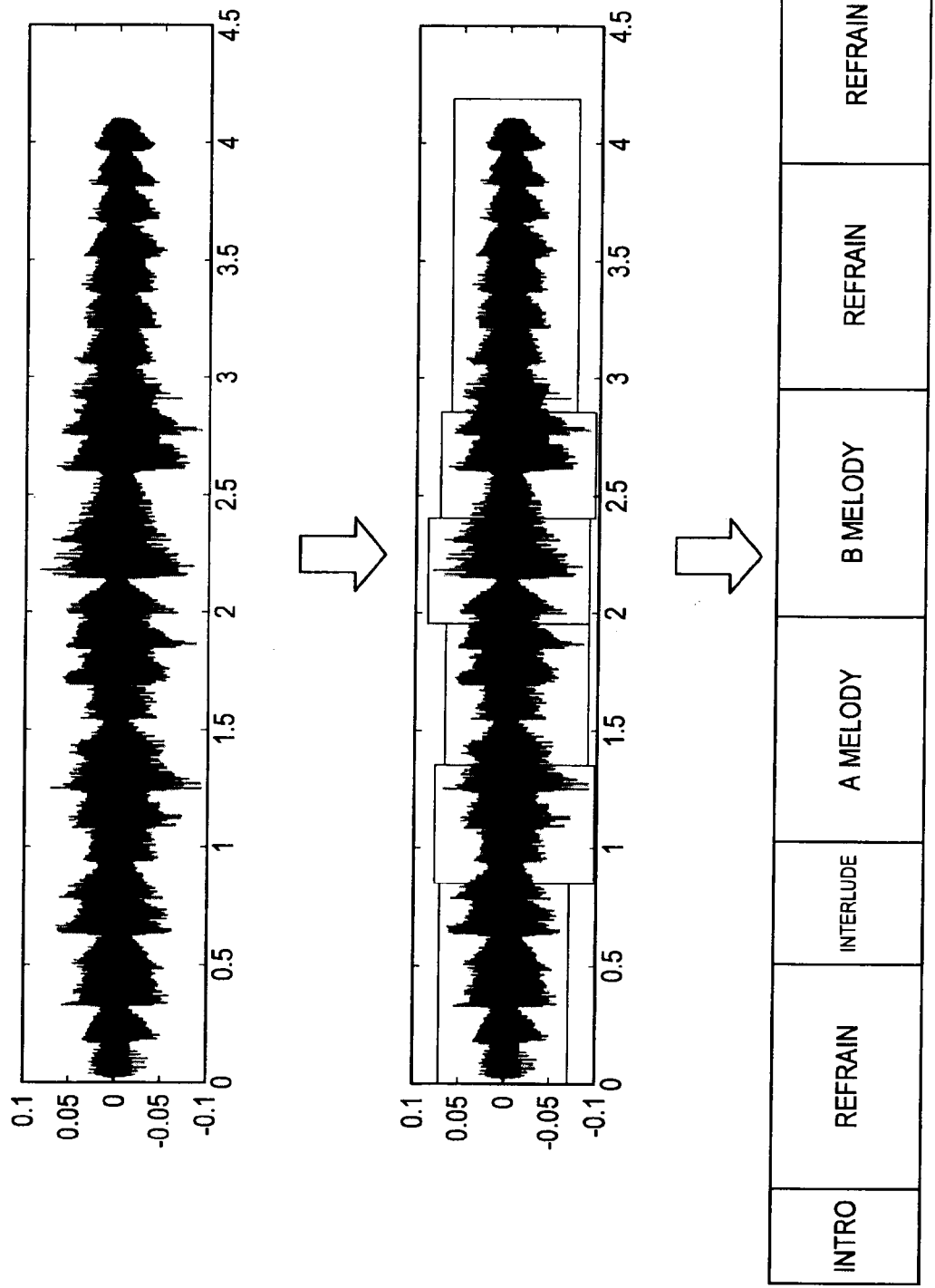
FIG. 4 is an explanatory diagram showing segmentation of music data.

FIG. 4 is an explanatory diagram showing segmentation of music data. First, the analysis section 228 divides music data expressed as a music signal in a time domain as shown in the top diagram of FIG. 4 into multiple meaningful segments as shown in the middle diagram of FIG. 4. This division can be performed by using MATLAB MIR Tool Kit, for example.

Subsequently, the analysis section 228 analyzes each segment, and detects refrain portions in the analyzed segment as shown in the bottom diagram of FIG. 4. For example, the analysis section 228 may detect the refrain portions based on at least one of the following three assumptions.

Assumption 1

A refrain portion ranges over an acceptable and appropriate length (for example, 7.7 to 40 seconds).

Assumption 2

When a long portion is repeated (for example, A melody, B melody and refrain are repeated), it is highly probable that the end part of the long portion is the refrain portion.

Assumption 3

When a portion is a repetition of portions about half its size, it is highly probable that the portion is the refrain portion.

Moreover, the detection of a refrain (chorus) portion can also be performed by a method described in "Masataka Goto: *SmartMusicKIOSK: Music Listening Station with Chorus-Search Function*, Proceedings of Interaction 2003 of IPSJ (Information Processing Society of Japan), pp. 9-16, February 2003."

Then, the analysis section 228 extracts the segment data and the enveloped data of the detected refrain portion (or the entire music data). Concrete examples of the segment data and the enveloped data are shown in FIG. 5.

FIG. 5 is an explanatory diagram showing the concrete examples of the segment data and the enveloped data. As shown in FIG. 5, when the title of music data is "TrackA," the segment data of the music data is expressed as "Data¥segment2¥TrackA.csv." Furthermore, the enveloped data of each segment of the music data is expressed as "Data¥envelope2¥TrackA__1.csv."

Furthermore, the segment data includes the following data as shown in FIG. 5.

Segment ID
Segment start time (Time_begin)
Segment end time (Time_end)
Playing time (Length)
Degree of refrain likeliness (Refrain)
 Parameter indicating the refrain likeliness. Max=1.0.
Key
 C=1, C#=2, D=3, D#=4, E=5, F=6, F#=7, G=8, G#=9, A=10, A#=11, B=12.
Major/minor (Mode)
 Major=1, minor=2.
Tempo
Number of Onsets (Onsets)
 Number of signal peaks in a segment
Number of Banks (Bank)
 A number into which a signal in a segment is divided in a frequency domain.
Number of Enveloped Data (Env)
 Number of enveloped data in a segment.
Maximum Level (Max Level)

Furthermore, the enveloped data is data in which signal intensities for respective banks are described in a time-series manner as shown in FIG. 5. Moreover, in FIG. 5, an example is shown where each segment is divided into 10 banks (frequency ranges). Furthermore, bank 1 (Bank__1) is the lowest frequency range, and bank 10 (Bank__10) is the highest frequency range. Furthermore, the maximum value of the signal intensity is expressed as "1."

Here, returning to the explanation of the configuration of the PC 20 with reference to FIG. 3, the operation input section 232 accepts an instruction and an input based on a user operation. For example, the operation input section 232 may include a mouse, a keyboard, or the like.

The portable device management section 236 manages music data to be stored in the portable device 10. For example, when a transfer instruction from a user for certain music data is accepted by the operation input section 232, the portable device management section 236 transfers the music data to the portable device 10. Furthermore, when the communication section 216 and the portable device 10 are connected to each other, the portable device management section 236 may also automatically (and selectively) transfer music data stored in the storage section 224 to the portable device 10. Here, along with the transfer of the music data, the portable device management section 236 also transfers the segment data and the enveloped data of the music data to the portable device 10.

(4) Configuration of Portable Device

Subsequently, referring to FIGS. 6 to 14, a configuration of the portable device 10 according to the present embodiment will be described.

Figure 6:
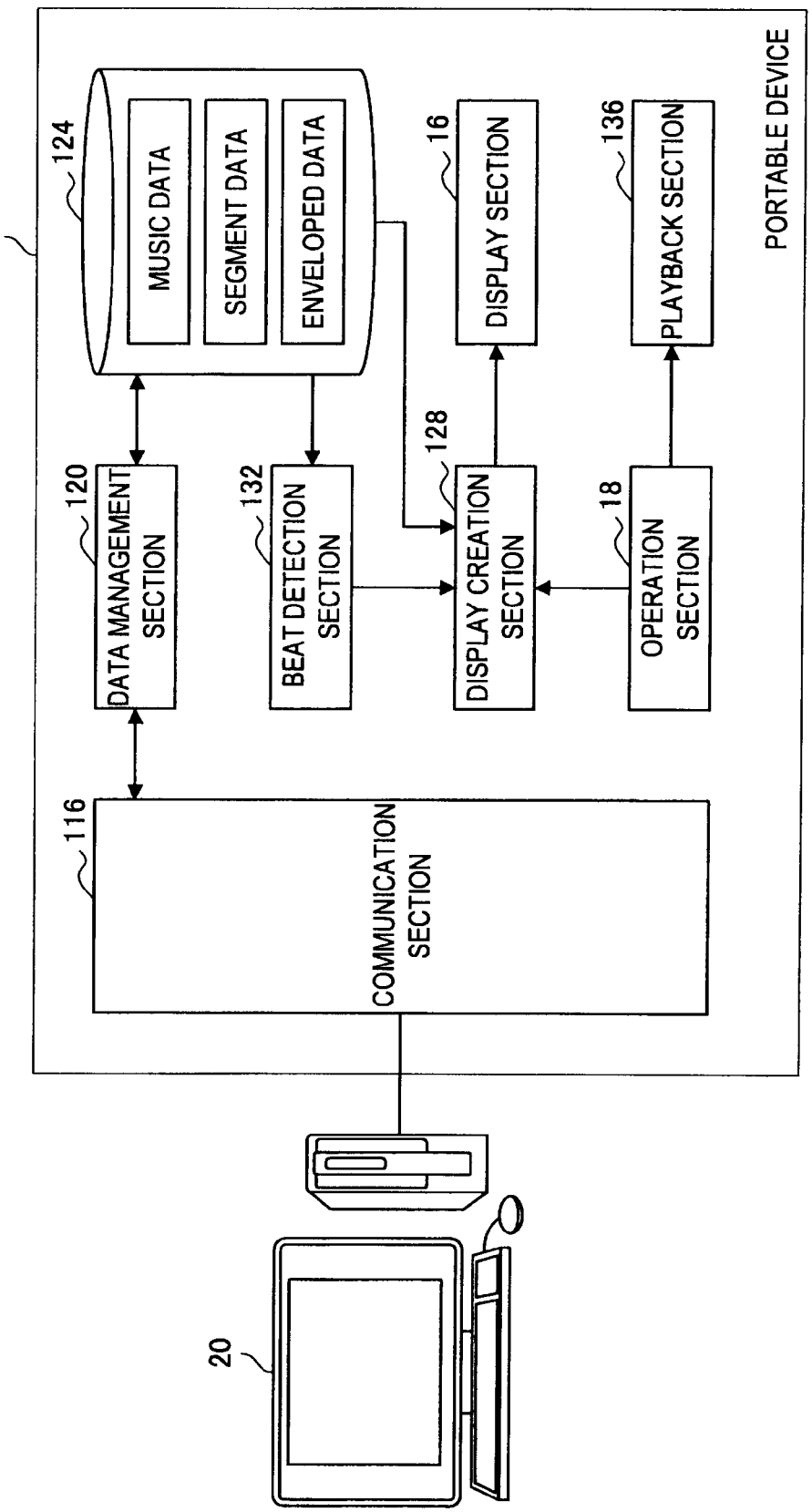
FIG. 6 is a function block diagram showing a configuration of a portable device according to the present embodiment.

FIG. 6 is a function block diagram showing the configuration of the portable device 10 according to the present embodiment. As shown in FIG. 6, the portable device 10 includes a communication section 116, a data management section 120, a storage section 124, a display creation section 128, a beat detection section 132, a playback section 136, a display section 16, and an operation section 18.

The communication section 116 is an interface to the PC 20, and receives music data, segment data, enveloped data, and the like, from the PC 20. The data management section 120 stores the music data, the segment data and the enveloped data received by the communication section 116 in the storage section 124. Moreover, the portable device 10 may also directly acquire the music data from the content server 30. Furthermore, although an example where the PC 20 analyzes the music data and acquires the segment data and the enveloped data is mainly described in the present embodiment, the present invention is not limited to such an example. For example, the portable device 10 may analyze the music data received from the PC 20 and acquire the segment data and the enveloped data. Furthermore, both functions of the PC 20 and the portable device 10 can be implemented in the PC 20 or the portable device 10.

The storage section 124 stores the music data, the segment data, and the enveloped data. As with the storage section 224 of the PC 20, the storage section 124 may be a storage medium, such as a non-volatile memory, a magnetic disk, an optical disk, a MO disk, or the like.

The display creation section 128 has a function of a creation section for creating various list screens to be displayed on the display section 16. The list screen may be a normal list screen, an icon list screen, a jacket grid screen, an icon grid screen, or the like. In the following, examples of the list screen will be shown in FIGS. 7 to 10.

Figure 7:
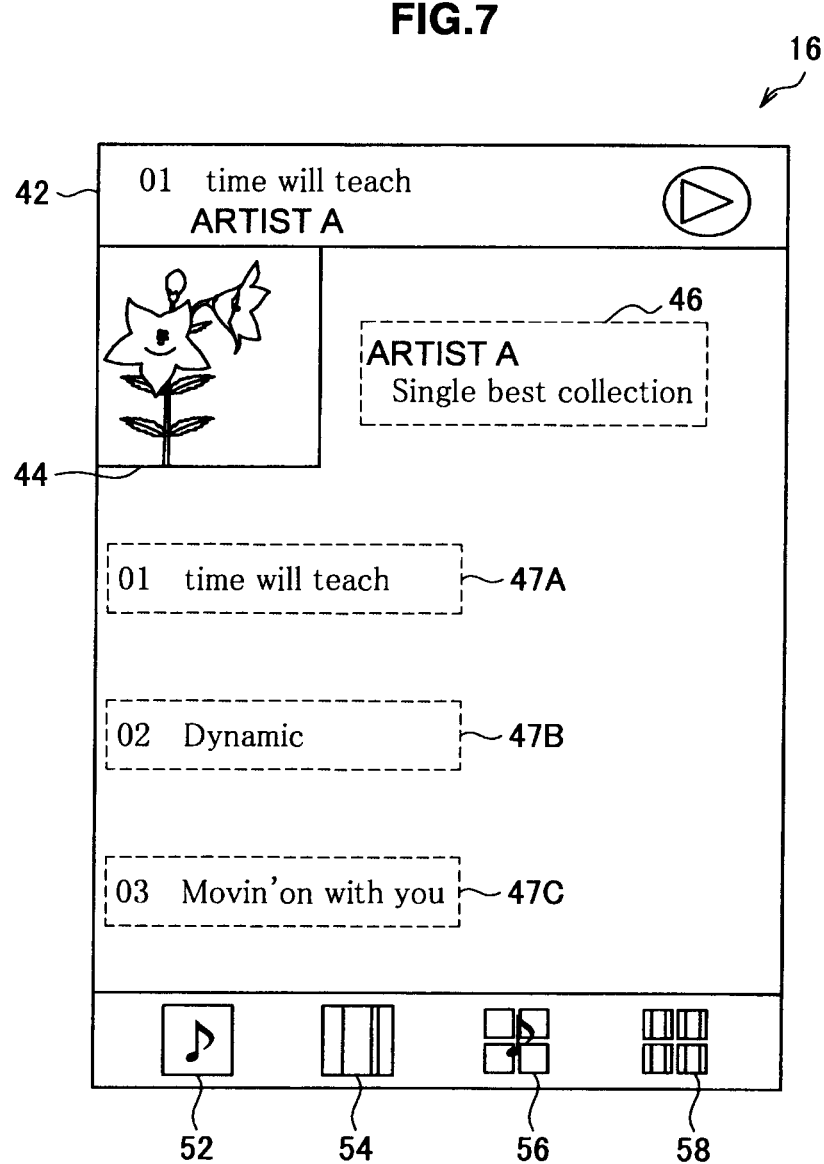
FIG. 7 is an explanatory diagram showing an example of a normal list screen.

FIG. 7 is an explanatory diagram showing an example of the normal list screen. As shown in FIG. 7, the normal list screen includes an indicator domain 42 including the track title of music data being played back, the artist name and a play/pause button, a jacket photograph 44, album information 46, and track information 47A to 47C. When any of the track information 47A to 47C is selected by a user, the playback section 136 of the portable device 10 switches the playback target to music data corresponding to the selected piece of the track information 47A to 47C.

Furthermore, the normal list screen includes display switch icons 52, 54, 56, and 58. When the display switch icon 54 is selected, the display creation section 128 switches the display to the icon list screen; when the display switch icon 56 is selected, the display creation section 128 switches the display to the jacket grid screen; and when the display switch icon 58 is selected, the display creation section 128 switches the display to the icon grid screen.

Figure 8:
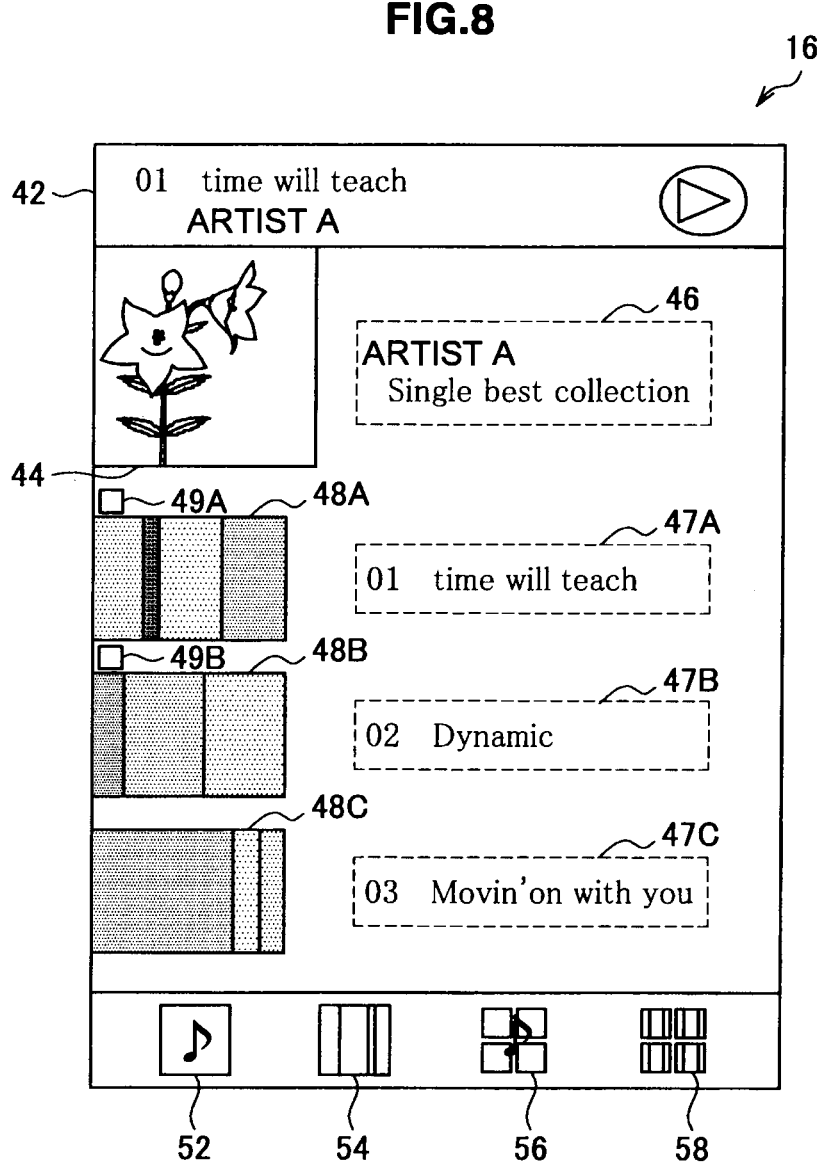
FIG. 8 is an explanatory diagram showing an example of an icon list screen.

FIG. 8 is an explanatory diagram showing an example of the icon list screen. As shown in FIG. 8, the icon list screen includes moving image icons 48A to 48C and flash parts 49A and 49B in addition to the indicator domain 42, the jacket photograph 44, the album information 46, and the track information 47A to 47C.

Each of the moving image icons 48A to 48C corresponds to a piece of music data, and has a movement according to the characteristics of the corresponding music data. Furthermore, an image is repetitively flashed in the flash parts 49A and 49B. Furthermore, at the time point shown in FIG. 8, it is indicated that the image in the flash part paired with the moving image icon 48C is turned off. Furthermore, the details of the moving image icon 48 and the flash part 49 will be described later.

Furthermore, when any of the track information 47A to 47C and the moving image icons 48A to 48C is selected by a user on the icon list screen, the playback section 136 of the portable device 10 switches the playback target to the corresponding music data. Furthermore, when the display switch icon 52 is selected, the display creation section 128 switches the display to the normal list screen; when the display switch icon 56 is selected, the display creation section 128 switches the display to the jacket grid screen; and when the display switch icon 58 is selected, the display creation section 128 switches the display to the icon grid screen.

Figure 9:
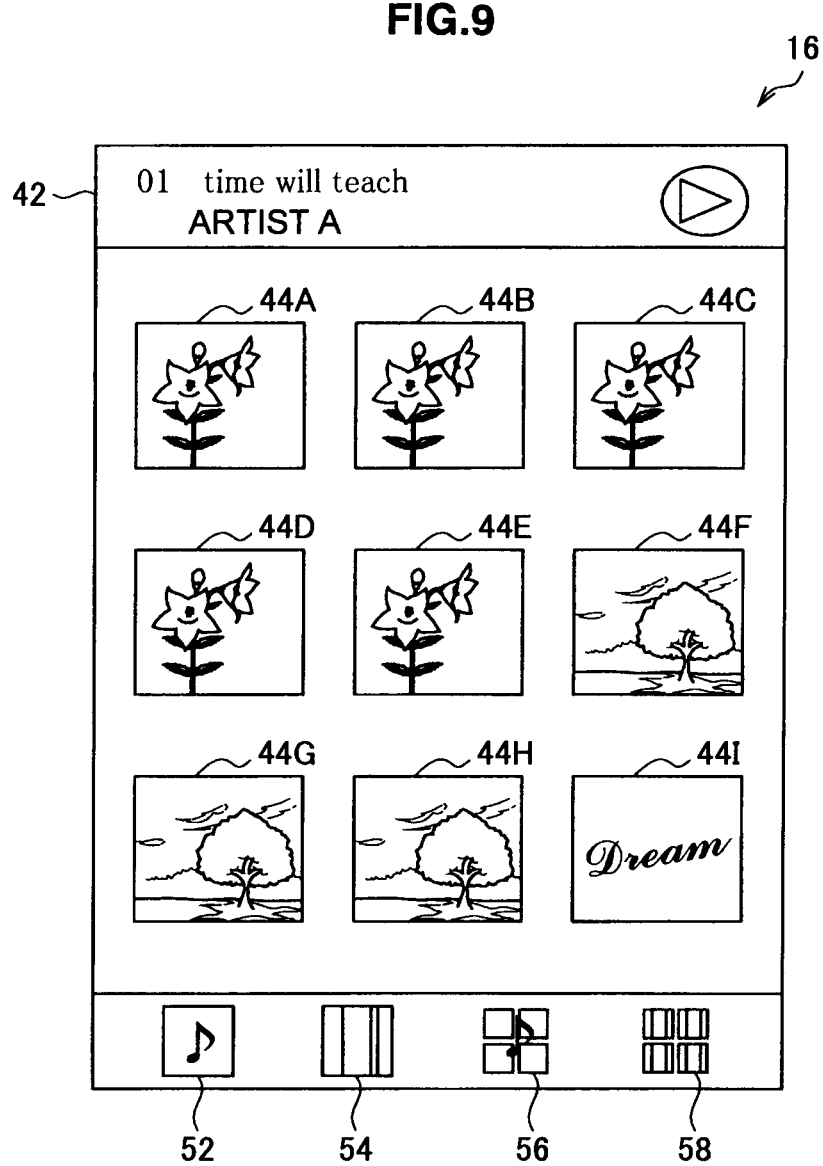
FIG. 9 is an explanatory diagram showing an example of a jacket grid screen.

FIG. 9 is an explanatory diagram showing an example of the jacket grid screen. As shown in FIG. 9, the jacket grid screen includes the indicator domain 42, and the jacket photographs 44A to 44I. Each of the jacket photographs 44A to 44I is a jacket photograph of an album to which music data belongs.

Furthermore, when one of the jacket photographs 44A to 44I is selected by the user on the jacket grid screen, the playback section 136 of the portable device 10 switches the playback target to music data corresponding to the selected one of the jacket photographs 44A to 44I. Furthermore, when the display switch icon 52 is selected, the display creation section 128 switches the display to the normal list screen; when the display switch icon 54 is selected, the display creation section 128 switches the display to the icon list screen; and when the display switch icon 58 is selected, the display creation section 128 switches the display to the icon grid screen.

Figure 10:
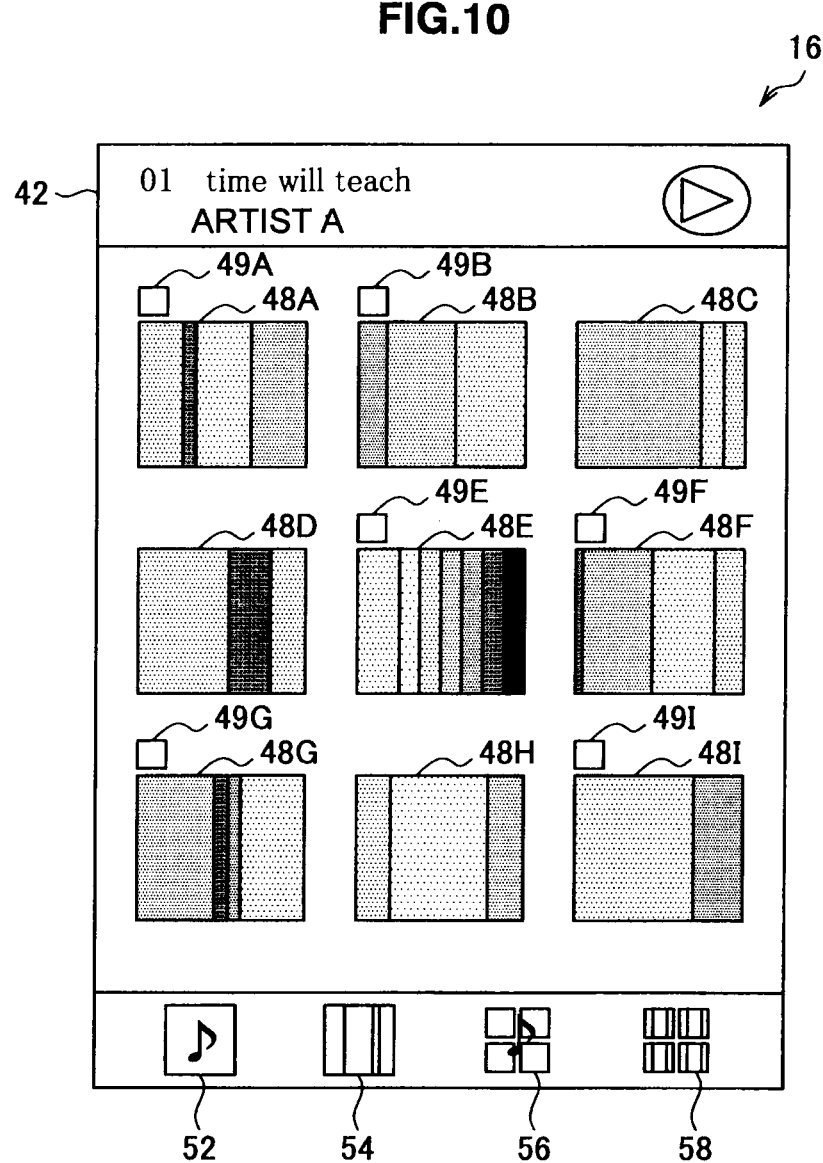
FIG. 10 is an explanatory diagram showing an example of an icon grid screen.

FIG. 10 is an explanatory diagram showing an example of the icon grid screen. As shown in FIG. 10, the icon grid screen includes the indicator domain 42, the moving image icons 48A to 48I, and flash parts 49 paired with the moving image icons 48A to 48I.

When one of the moving image icons 48A to 48I is selected by the user on the icon grid screen, the playback section 136 of the portable device 10 switches the playback target to the corresponding music data. Furthermore, when the display switch icon 52 is selected, the display creation section 128 switches the display to the normal list screen; when the display switch icon 54 is selected, the display creation section 128 switches the display to the icon list screen; and when the display switch icon 56 is selected, the display creation section 128 switches the display to the jacket grid screen.

Subsequently, the moving image icon 48 and the flash part 49 will be described in detail.

(Flash Part)

The beat detection section 132 of the portable device 10 detects the beat of each music data based on the enveloped data stored in the storage section 124. Here, since the beat tends to appear in the low frequency band, the beat detection section 132 may detect, as the beat, the timing at which the signal intensity of the enveloped data in the low frequency band (for example, bank 1) exceeds a predetermined value.

Then, the display creation section 128 flashes the image in the flash part 49 in accordance with the beat detected by the beat detection section 132. Specifically, the display creation section 128 flashes the image in the flash part 49 at a timing at which there is a beat detected by the beat detection section 132. Furthermore, at the time of flashing the image in the flash part 49, the display creation section 128 may express the strength of the beat (signal intensity in the low frequency band) by the brightness of the image. Moreover, an example is shown in the drawing where the image in the flash part 49 is a square. However, the shape and color of the image in the flash part 49 may be any shape and color, and may be made to match the color arrangement of the moving image icon described below or the cluster of music data.

(Moving Image Icon)

Figure 11:
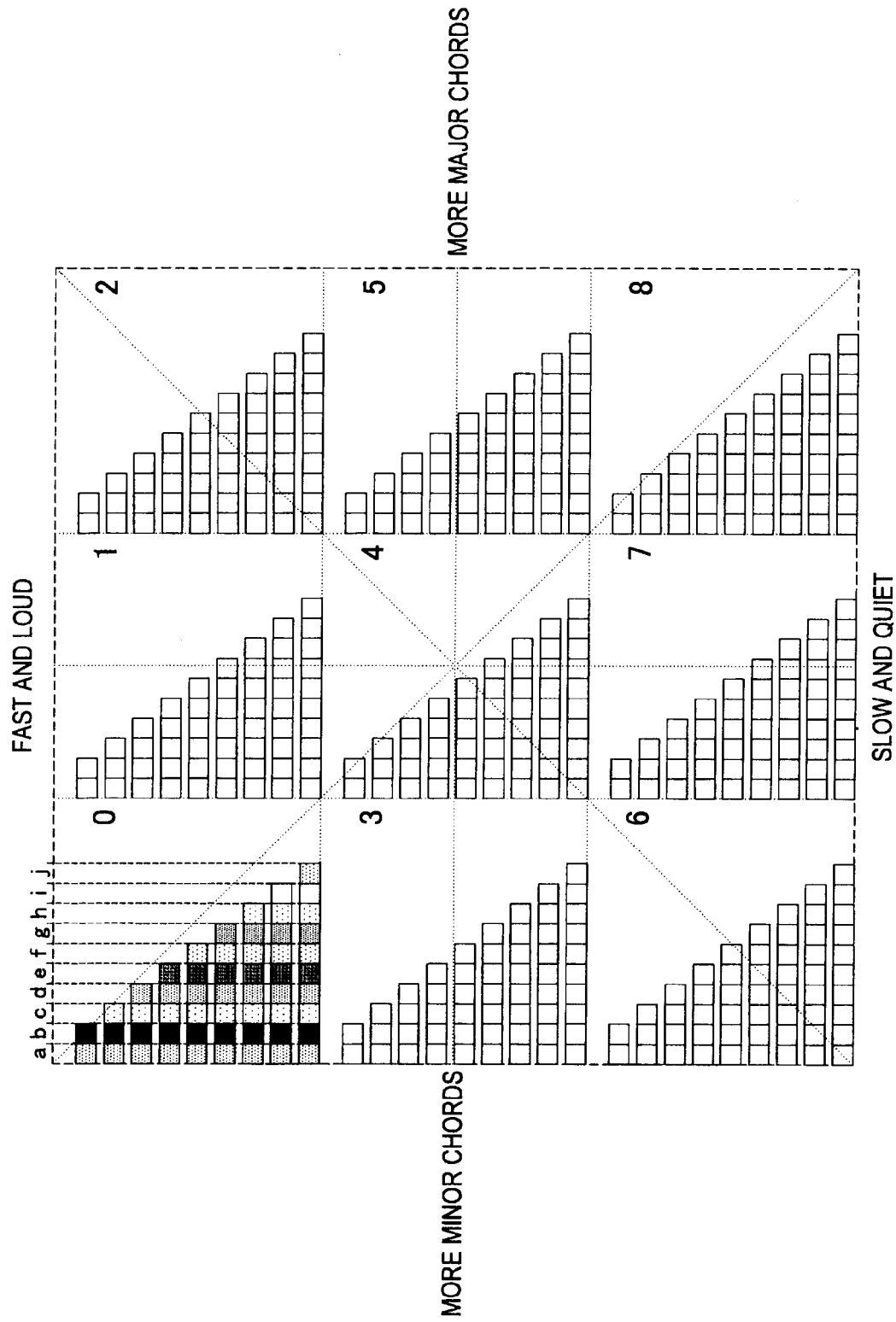
FIG. 11 is an explanatory diagram showing a relationship between clusters and characteristics of music data.

At the time of creating the moving image icon, the display creation section 128 classifies each music data into one of the nine clusters (genres) shown in FIG. 11.

FIG. 11 is an explanatory diagram showing a relationship between the clusters and the characteristics of music data. In FIG. 11, the horizontal axis indicates the proportion of minor keys in music data, and the vertical axis indicates a parameter of tempo and volume of music data. Furthermore, the color arrangement of each of the squares included in FIG. 11 is shown in FIG. 12. In FIG. 12, "0" corresponds to house music, "1" corresponds to ambient music, and "2" corresponds to techno music. Similarly, "3" corresponds to jazz music, "4" corresponds to mesomusic, "5" corresponds to pops, "6" corresponds to mellow music/Japanese traditional ballad, "7" corresponds to café music, and "8" corresponds to bossa nova music. Furthermore, the squares in each cluster correspond, sequentially from the left column, to a to j. In this way, although the color arrangement of each square is different, for the sake of clarity of the drawing, only the colors of the squares included in the house music is distinctively shown in FIG. 11.

Here, parameter mix of tempo and volume is calculated in the following manner.

level=1.0−((low-volume time of segment)/playing time of segment)

mix=average tempo of music tempo×level

Accordingly, among music data of music which is fast and loud, music data of cheerful music having a low proportion of minor keys is classified as techno music, music data of melancholy music having a high proportion of minor keys is classified as house music, and music data of music having neither high nor low proportion of minor keys is classified as ambient music. Moreover, a threshold value for evaluating the high or low of the proportion of the minor keys and a threshold value for evaluating the parameter mix may be set in advance. Furthermore, the proportion of the minor keys can be identified based on major/minor (mode) included in the segment data.

Furthermore, among music data of music which is slow and quiet, music data of cheerful music having a low proportion of minor keys is classified as bossa nova music, music data of melancholy music having a high proportion of minor keys is classified as mellow music/Japanese traditional ballad, and music data of music having neither high nor low proportion of minor keys is classified as café music.

Furthermore, among music data of music with intermediate parameter mix, music data of cheerful music having a low proportion of minor keys is classified as pops, music data of melancholy music having a high proportion of minor keys is classified as jazz music, and music data of music having neither high nor low proportion of minor keys is classified as mesomusic.

The colors included in lower rows, among the rows in a classified cluster, are selected by the portable device 10 as the total number of onsets of each segment data configuring the music data becomes larger. Accordingly, the larger the total number of onsets is, the more colors are selected.

Furthermore, the display creation section 128 creates the moving image icon 48 by moving the squares of the colors selected in the above-described manner with the magnitude of change (speed) in proportion to the tempo of each segment. The movement in the moving image icon 48 will be described with reference to FIGS. 13 and 14.

Figure 13:
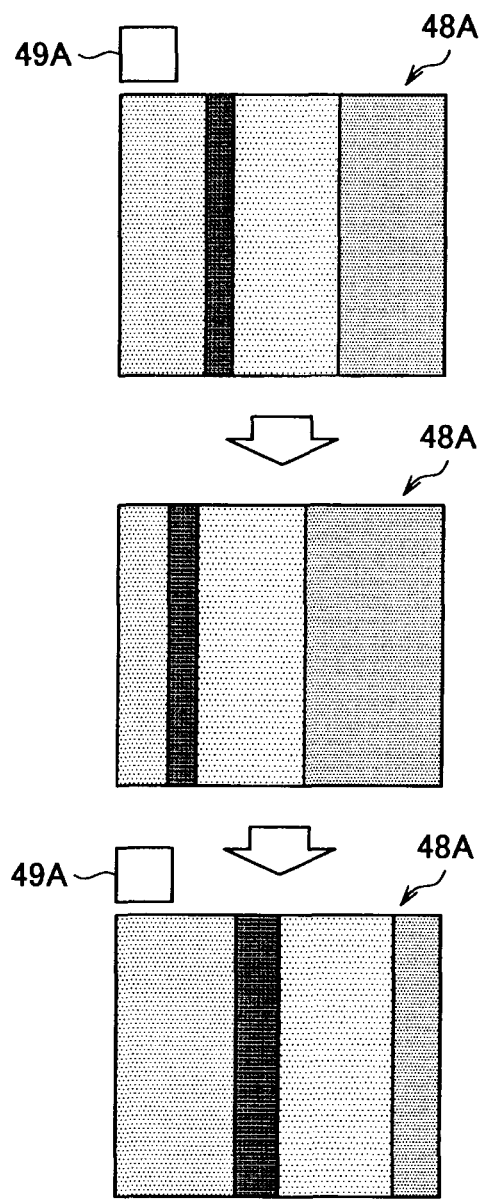
FIG. 13 is an explanatory diagram showing a moving image icon and a flash part corresponding to first music data.

FIG. 13 is an explanatory diagram showing the moving image icon 48A and the flash part 49A corresponding to first music data. As shown in FIG. 13, the display creation section 128 creates the moving image icon 48A formed from areas of each selected color. Furthermore, the display creation section 128 continuously changes, with time, the position and the size of the area of each color within the moving image icon 48A according to the tempo of the current segment. Moreover, when dealing with music data which is currently not the playback target of the playback section 136, the moving image icon 48A repeats a movement which is the same as that of when loop playback is performed for a portion (for example, the refrain portion) of acquired segment data among the music data. Furthermore, when dealing with music data which is currently the playback target of the playback section 136, the moving image icon 48A moves in synchronization with the position currently being played back.

Figure 14:
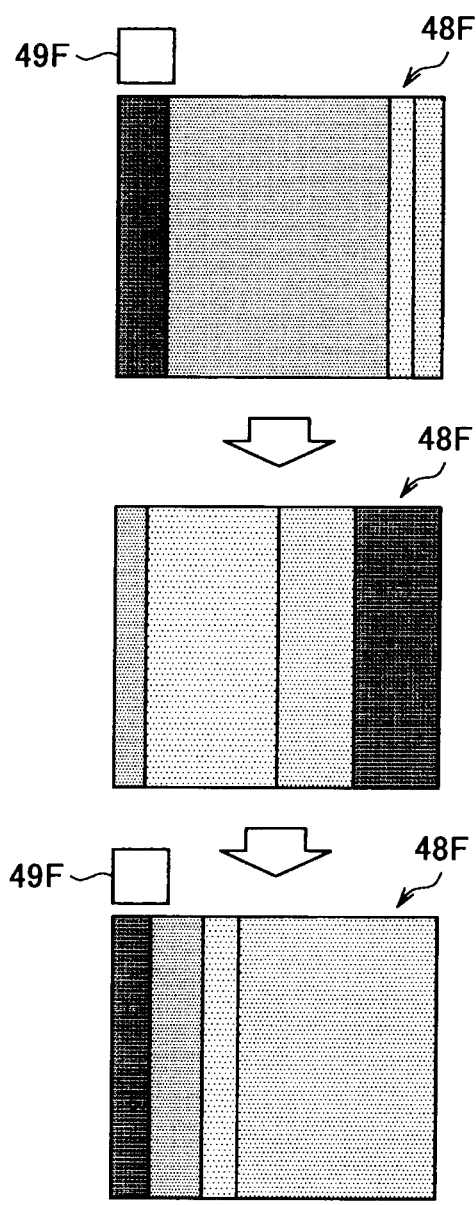
FIG. 14 is an explanatory diagram showing a moving image icon and a flash part corresponding to second music data faster in tempo than the first music data.

FIG. 14 is an explanatory diagram showing the moving image icon 48F and the flash part 49F corresponding to second music data faster in tempo than the first music data. Here, the time intervals between each of the diagrams in FIGS. 13 and 14 are the same. In this case, as shown in FIG. 14, the display creation section 128 creates the moving image icon 48F with a movement more dynamic than that of the moving image icon 48A corresponding to the first music data. Moreover, the movement of the moving image icon 48 can be expressed to be more dynamic as the moving speed of the area of each color is faster and the changing speed of the size of the area of each color is faster. Furthermore, the order and the moving direction of the areas of colors are arbitrary.

As described above, the portable device 10 according to the present embodiment can display the moving image icon 48 and the flash part 49 on the list screen, such as the icon list screen or the icon grid screen. With this configuration, the user can grasp, from the moving image icon 48 and the flash part 49 on the list screen, larger amount of information relating to the characteristics of the music data compared to a case where a still image is used. Thus, the user of the portable device 10 according to the present embodiment can efficiently search for music data having desired characteristics from the list screen of music data.

Moreover, in the present embodiment, an example has been described where the moving image icon 48 having color arrangement and magnitude of movement according to the characteristics of music data is created. However, the present invention is not limited to such an example. For example, the display creation section 128 may also create a moving image icon in which the shape, texture or the like of an object changes according to the characteristics of music data.

(5) Operation of Information Processing System According to Present Embodiment

Next, a flow of the operation of the information processing system 1 according to the present embodiment will be described with reference to FIG. 15.

FIG. 15 is a sequence diagram showing the flow of the operation of the information processing system 1 according to the present embodiment. As show in FIG. 15, first, the analysis section 228 of the PC 20 analyzes music data, and acquires segment data and enveloped data (S304). Then, the portable device management section 236 of the PC 20 transfers the music data, the segment data and the enveloped data to the portable device 10 (S308). The storage section 124 of the portable device 10 stores the music data, the segment data and the enveloped data transferred from the PC 20 (S312).

Then, the display creation section 128 of the portable device 10 creates the moving image icon 48 based on the segment data (S316). Specifically, as described above, the music data is classified into one of the nine clusters based on the segment data, the colors to be used are selected based on the total number of onsets, and an image formed from areas of selected colors is changed according to the tempo. Furthermore, the beat detection section 132 detects the beat of the music data based on the enveloped data (S320), and the display creation section 128 creates a list screen including the flash part 49 which flashes according to the detected beat as well as the moving image icon 48 (S324). Then, the playback section 136 of the portable device 10 starts playback of the music data selected by the user on the list screen (S328).

(6) Conclusion and Supplement

As described above, the portable device 10 according to the present embodiment can display, on the list screen of music data, the moving image icon 48 having color arrangement and movement according to the characteristics of each music data. With this configuration, the user can more intuitively grasp the characteristics of the music data based on the moving image icon 48. Furthermore, with the present embodiment, since the moving image icon 48 can be created mainly for the refrain portion of the music data, the representative characteristics of the music data can be visualized regardless of the length of the entire music data.

It should be understood by those skilled in the art that various modifications, combinations, sub-combinations and alterations may occur depending on design requirements and other factors insofar as they are within the scope of the appended claims or the equivalents thereof.

For example, in the above-described embodiment, an example is described where the operation section 18 provided on the portable device 10 is a button. However, the present invention is not limited to such an example. As a modified example, the portable device 10 may be provided with a touch panel, and a user operation may be detected by the touch panel. Furthermore, the nine clusters described above and the classification method of music data into one of the clusters are examples only, and the music data can be classified into one of arbitrary clusters by an arbitrary classification method.

Furthermore, an example is described above where the analysis section 228 of the PC 20 analyzes the music data and acquires the segment data and the enveloped data. However, the present invention is not limited to such an example. For example, the content server 30 may transmit, along with the transmission of music data, the segment data and the enveloped data of the music data. Furthermore, an example is described above where the music data is classified by the portable device 10 into one of the nine clusters. However, the present invention is not limited to such an example. For example, the cluster into which the music data is classified may be added to the music data in advance as attribute data. Furthermore, by using the segment data and the enveloped data, moving image icons of other designs can be created easily and in large amounts.

Furthermore, each of the steps performed by the information processing system 1 in this specification need not necessarily be performed chronologically in the order shown in the sequence diagram. For example, each of the steps performed by the information processing system 1 may include processing in parallel or as individual steps (for example, parallel processing or object processing).

A computer program may also be created that directs hardware such as the CPU 201, the ROM 202, the RAM 203, and the like built into the PC 20 or the portable device 10 to fulfill functions corresponding to each of the configurations of the PC 20 or the portable device 10 described above. A storage medium in which the computer program is stored is also provided. The series of processes can also be performed by hardware by configuring each of the function blocks shown in the function block diagrams of FIGS. 3 and 6 as the hardware.

The present application contains subject matter related to that disclosed in Japanese Priority Patent Application JP 2008-216154 filed in the Japan Patent Office on Aug. 26, 2008, the entire content of which is hereby incorporated by reference.

What is claimed is:

1. An information processing apparatus, comprising:
  a storage section storing a plurality of content data and characteristics data of the plurality of content data, wherein the characteristics data includes tempo information of each of the plurality of content data, intensity information of each frequency range of each of the plurality of content data, and one or more colors are assigned to respective genres of the plurality of content data;
  a detection section for detecting a beat of each of the plurality of content data based on the intensity information of each frequency range; and
  a creation section for creating a moving image having movement according to the characteristics data of each of the plurality of content data and a flash part corresponding to each of the plurality of content data, and for creating a list screen of the plurality of content data wherein
    the list screen includes the moving image and the flash part paired with the moving image for each of the plurality of content data,
    the creation section flashes an image in the flash part according to the beat of the each of the plurality of content data detected by the detection section,
    brightness of the image in the flash part is dynamically changed based on strength of the beat of each of the plurality of content data,
    the moving image is formed from at least one color among the one or more colors assigned to a genre of content data to which the moving image corresponds, and
    area of the at least one color within the moving image is dynamically changed based on tempo of a segment in each of the plurality of content data.

2. The information processing apparatus according to claim 1, wherein
  the creation section creates the moving image of which movement is more dynamic as tempo of each of the plurality of content data is faster.

3. The information processing apparatus according to claim 1, wherein
  each of the plurality of content data is music data, and
  the intensity information of each frequency range indicates intensity of each frequency range of a refrain portion among the music data.

4. The information processing apparatus according to any one of claims 1, 2, and 3, further comprising:
  an analysis section for analyzing each of the plurality of content data, and for acquiring the characteristics data of each of the plurality of content data.

5. A non-transitory computer-readable medium having stored therein a program for causing a computer to function as:
  a storage section storing a plurality of content data and characteristics data of the plurality of content data, wherein the characteristics data includes tempo information of each of the plurality of content data, intensity information of each frequency range of each of the plurality of content data, and one or more colors are assigned to respective genres of the plurality of content data;

a detection section for detecting a beat of each of the plurality of content data based on the intensity information of each frequency range; and a creation section for creating a moving image having movement according to the characteristics data of each of the plurality of content data and a flash part corresponding to each of the plurality of content data, and for creating a list screen of the plurality of content data, wherein the list screen includes the moving image and the flash part paired with the moving image for each of the plurality of content data, the creation section flashes an image in the flash part according to the beat of the each of the plurality of content data detected by the detection section, brightness of the image in the flash part is dynamically changed based on strength of the beat of each of the plurality of content data, the moving image is formed from at least one color among the one or more colors assigned to a genre of content data to which the moving image corresponds, and area of the at least one color within the moving image is dynamically changed based on tempo of a segment in each of the plurality of content data.

6. An information processing method, comprising the steps of:

storing in a storage medium a plurality of content data and characteristics data of the plurality of content data, wherein the characteristics data includes tempo information of each of the plurality of content data, intensity information of each frequency range of each of the plurality of content data, and one or more colors are assigned to respective genres of the plurality of content data;

detecting a beat of each of the plurality of content data based on the intensity information of each frequency range;

creating a moving image corresponding to each of the plurality of content data and having movement according to the characteristics data of each of the plurality of content data, and a flash part corresponding to each of the plurality of content data, wherein the moving image is formed from at least one color among the one or more colors assigned to a genre of content data to which the moving image corresponds, and area of the at least one color within the moving image is dynamically changed based on tempo of a segment in each of the plurality of content data; and creating a list screen of the plurality of content data, wherein the list screen includes the moving image and the flash part paired with the moving image for each of the plurality of content data, an image in the flash part is flashed according to the beat of the each of the plurality of content data detected by the detection section, and brightness of the image in the flash part is dynamically changed based on strength of the beat of each of the plurality of content data.

* * * * *